J. M. STUDEBAKER & H. L. HINDS.
MACHINES FOR COOLING TIRES.

No. 181,740. Patented Aug. 29, 1876.

UNITED STATES PATENT OFFICE.

JOHN M. STUDEBAKER AND HUGH L. HINDS, OF SOUTH BEND, INDIANA.

IMPROVEMENT IN MACHINES FOR COOLING TIRES.

Specification forming part of Letters Patent No. 181,740, dated August 29, 1876; application filed April 10, 1876.

*To all whom it may concern:*

Be it known that we, JOHN M. STUDEBAKER and HUGH L. HINDS, both of South Bend, in the county of St. Joseph and State of Indiana, have invented certain new and useful Improvements in Machines for Cooling Tires; and we do hereby declare that the following is a full and exact description thereof, reference being had to the accompanying drawings, making a part of this specification.

Our invention relates to improvements in setting and cooling tires; and has for its object to expedite the placing of the tire upon the rim of the wheel, and cooling and shrinking the same uniformly without removing the wheel from the horizontal platform upon which it rests while the tire is being placed. With these objects in view, our invention consists of a water tank or reservoir, inside of which is arranged a suitable platform for supporting a wheel in a horizontal position, said platform being capable of vertical adjustment, through suitable mechanism, in order that the wheel may be sustained above the water-level, and lowered into and again returned to its normal position, as will be hereinafter more fully set forth.

Previous to our invention, it has been customary, after the heated tire is placed upon the wheel in a horizontal position, to lift the wheel and rotate it in a vertical plane in a shallow water-reservoir, to cool the same. This operation presenting, as it does, different portions of the heated tire to the action of the water at different times, necessarily cools the same unevenly, producing an obviously bad result. By our invention, no such difficulties or results ensue; but, on the contrary, the wheel being immersed horizontally, all parts of its periphery are acted upon simultaneously, and with like effect, by the water.

To enable those skilled to understand more fully our invention, we will describe the same, referring by letters to the accompanying drawing, in which—

Figure 1:
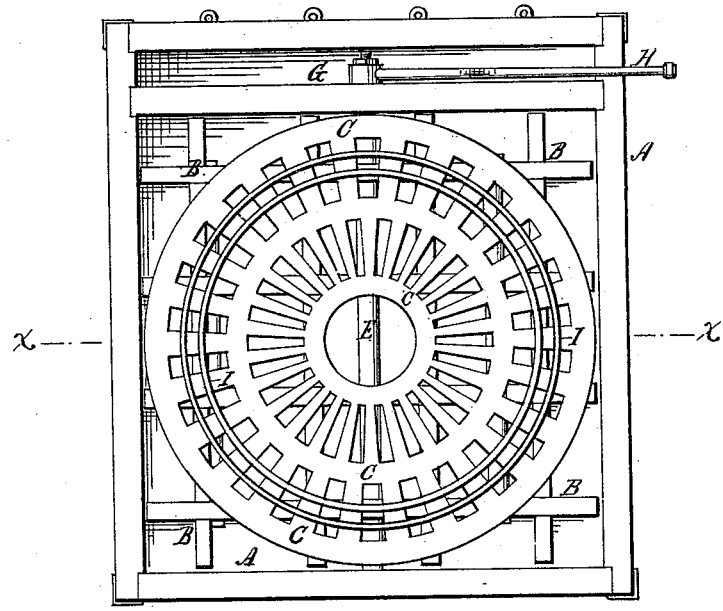
Figure 2:
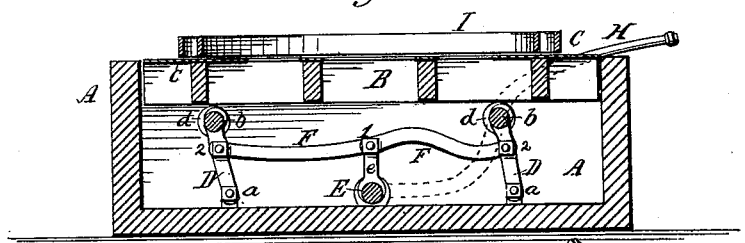

Figure 1 is a top view of an apparatus embodying the features of our invention; Fig. 2, a vertical cross-section at the line $x\, x$, Fig. 1, showing the wheel-platform above the water-level of the reservoir; and Fig. 3, a similar view, with the platform and wheel-tires immersed.

Similar letters indicate like parts in the several views.

We have, for the sake of avoiding confusion of lines in the drawing, shown the platform as supporting two tires of different diameters; but of course the platform is designed to support wheels of different diameters, the hub projecting into the central opening of the platform.

A represents a water-tight tank or reservoir, of suitable dimensions to receive a wheel of any ordinary size horizontally; and B is a platform formed of intersecting bars, upon which is arranged a metal protector or shield, C, of any desired design. D D' are two or more vibrating arms, pivoted or hinged, at $a$, to the bottom of the tank at either end, connected at their free ends by a straight bar, $b$, on the extreme ends of which are secured anti-friction wheels $d$, upon which rest the opposite extreme parallel bars of the platform B. E is a rocking shaft, arranged in bearings at the bottom of the tank, midway between the pivots of the vibrating arms D. This rocking shaft is provided with two vertical arms, $e\, e$, which are connected to the opposite pairs of arms D by pitman-rods F F, pivoted to the arms $e\, e$ at 1, and to the arms D at 2, so that the rocking of the shaft E induces the raising and lowering of the free ends of the arms D, and consequently lifts and lowers the platform B, resting thereon, the under side of which is provided with suitable wear-irons. One end of the rocking shaft E extends into a compartment, G, and is provided with a hand-lever, H, by means of which the shaft is rocked in an obvious manner. Additional anti-friction wheels similar to $d$ may be arranged upon the bars $b$, according to the number of parallel bars forming the platform, and the tank may be furnished with suitable vertical guides at either side, to guide the platform in its vertical movements, although we have not yet found it essentially necessary.

Figure 3:
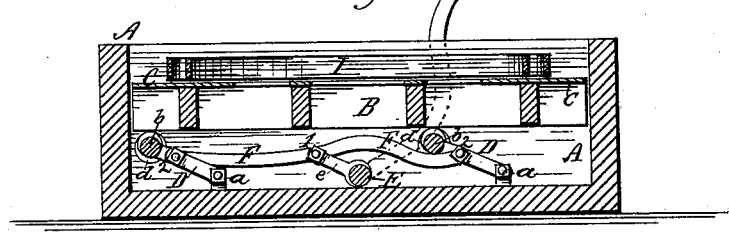

The operation of the apparatus is as follows: The heated tire I being brought from the heating-furnace (described in another application for Letters Patent filed by us) is placed upon the wheel, which has been previously located upon the platform-shield C, the platform being supported above the water within the tank by the connecting-bars and arms D. The latter, being in a perfectly-vertical line, maintain the platform against accidentally dropping down. As soon as the tire is properly adjusted and set in place, the lever H is grasped and raised, which rocks the shaft E, and carries down the supporting-arms D D', thus lowering the platform and the wheel resting thereon in a horizontal plane into the water contained within the tank or reservoir A, as shown at Fig. 3, where they remain until the tire is entirely or sufficiently cooled, when the end of the lever H is depressed, and the platform and wheel elevated, when the wheel is removed, and the platform is in position to receive another.

Of course, the platform and protecting metal shield should be of skeleton form, in order that they may be the more readily immersed and lifted.

Our apparatus may be varied in many particulars without departing from the spirit of our invention, the gist of which, as before stated, lies in combining, with a water-tank, a wheel-support adapted to be raised and lowered horizontally above and below the water contained within the tank.

What we claim as new, and desire to secure by Letters Patent, is—

In combination with the water tank or reservoir and wheel-supporting platform herein described, the connected vibrating supporting-arms and rocking shaft, substantially as and for the purpose set forth.

Witness our hands and seals this 30th day of March, 1876.

J. M. STUDEBAKER. [L. S.]
HUGH L. HINDS. [L. S.]

Witnesses:
J. L. TAYLOR,
E. BYERLY.